United States Patent [19]

Abendroth et al.

[11] 4,111,880
[45] Sep. 5, 1978

[54] AQUEOUS ADHESION ASSISTANT DISPERSION FOR PRODUCING COMPOSITE BODIES BY VULCANIZATION

[75] Inventors: Henning Abendroth, Dusseldorf; Joachim Galinke, Langenfeld; Norbert Wiemers, Monheim-Baumberg, all of Fed. Rep. of Germany

[73] Assignee: Henkel Kommanditgesellschaft auf Aktien, Dusseldorf-Holthausen, Fed. Rep. of Germany

[21] Appl. No.: 855,175

[22] Filed: Nov. 28, 1977

[30] Foreign Application Priority Data

Dec. 1, 1976 [DE] Fed. Rep. of Germany ....... 2654352

[51] Int. Cl.$^2$ .............................................. C09J 3/12
[52] U.S. Cl. ........................... 260/29.6 MP; 156/327; 156/333; 156/334; 260/29.7 P; 260/29.6 MN; 260/29.7 N; 260/42.55
[58] Field of Search ................. 260/29.6 MP, 29.7 P, 260/29.6 MN, 29.7 N, 42.55; 156/327, 333, 334

[56] References Cited

U.S. PATENT DOCUMENTS 3,878,134  4/1975  Ozelli et al. ...................... 260/0.4 R Primary Examiner—Eugene C. Rzucidlo
Attorney, Agent, or Firm—Hammond & Littell

[57] ABSTRACT

An aqueous adhesion assistant or binder dispersion for use in the production of composite bodies by vulcanizing a vulcanizable rubber composition on a substrate which is stable under vulcanization conditions comprising water and at least one dispersing agent and a solids content of from 20% to 50% by weight of a solids composition of per (a) 100 parts by weight of an organic oligomeric to polymeric film-former,
(b) from 5 to 100 parts by weight of an aromatic poly-C-nitroso compound,
(c) from 5 to 100 parts by weight of a phosphorus-containing compound selected from the group consisting of an organic phosphonic acid, a compound producing an organic phosphonic acid under vulcanization conditions, a phosphoric acid partial ester, and a compound producing a phosphoric acid partial ester under vulcanization conditions, and
(d) from 0 to 200 parts by weight of customary fillers and pigments having an improving effect on the vulcanized bond; as well as the method of bonding rubbers to solid substrates employing said aqueous dispersion.

16 Claims, No Drawings

AQUEOUS ADHESION ASSISTANT DISPERSION FOR PRODUCING COMPOSITE BODIES BY VULCANIZATION

BACKGROUND OF THE INVENTION

The present invention relates to aqueous adhesion assistant or binder dispersions for use in the production of composite bodies by vulcanizing a vulcanizable rubber composition on a substrate which is stable under vulcanizing conditions, and the method of bonding rubbers to solid substrates.

Adhesion assistants or binders for the bonding of rubber by vulcanization onto substrates which are stable under vulcanization conditions, such as metals or also textiles, plastics or elastomers, have long been known. The binders suitable for universal bonding of elastomeric materials to metallic substrates at elevated temperatures normally contain polymeric film-formers, bonding aids, fillers and additives as well as organic solvents. U.S. Pat. No. 3,878,134, issued Apr. 15, 1975 to Ozelli et al, describes one such composition. A preferred group are products which contain halogenated or chlorosulfonated rubbers as film formers, polyfunctional isocyanates and/or organosilanes, as well as aromatic poly-nitroso-compounds as bonding aids, carbon black, silicic acid, basic lead phosphite and/or zinc oxide as fillers and additives, and aromatic and/or halogenated hydrocarbons as solvents.

Also known are binders which contain aqueous dispersions or solutions of specific carboxyl groupcontaining rubbers as main components, in combination with the usual solvents, as well as the combination of aqueous polymer dispersions with resorcinol/formaldehyde resins.

While the conventional adhesion assistants or binders have the disadvantages connected with the use of organic solvents with respect to toxicity, combustibility, economic efficiency, etc., the binders based on aqueous dispersions or solutions known until now actually do not show these disadvantages. However, what hinders a broader use of these systems is their lack of universality with respect to the elastomeric substrates to be bonded.

OBJECTS OF THE INVENTION

An object of the present invention is to develop a universally usable stable one-component binder for bonding a plurality of rubber types at elevated temperatures to a variety of substrates, which contain practically no volatile organic solvents or other environmentally undesirable substances and yet furnisn firm and resistant bonds.

Another object of the present invention is the obtaining of an aqueous adhesion assistant or binder dispersion for use in the production of composite bodies by vulcanizing a vulcanizable rubber composition on a substrate which is stable under vulcanization conditions comprising water and at least one dispersing agent and a solids content of from 20% to 50% by weight of a solids composition of per
  (a) 100 parts by weight of an organic oligomeric to polymeric film-former,
  (b) from 5 to 100 parts by weight of an aromatic poly-C-nitroso compound,
  (c) from 5 to 100 parts by weight of a phosphorus-containing compound selected from the group consisting of an organic phosphonic acid, a compound producing an organic phosphonic acid under vulcanization conditions, a phosphoric acid partial ester, and a compound producing a phosphoric acid partial ester under vulcanization conditions, and
  (d) from 0 to 200 parts by weight of customary fillers and pigments having an improving effect on the vulcanized bond.

A further object of the present invention is the improvement in the process of producing composite bodies by bonding vulcanizable rubber compositions to solid substrates stable under vulcanization conditions comprising coating a solid substrate stable under vulcanizing conditions with an adhesion assistant or binder, laminating a vulcanizable rubber composition thereto and vulcanizing the laminate, the improvement consisting of employing an aqueous adhesion assistant or binder dispersion comprising water and at least one dispersing agent and a solids content of from 20% to 50% by weight of a solids composition of per
  (a) 100 parts by weight of an organic oligomeric to polymeric film-former,
  (b) from 5 to 100 parts by weight of an aromatic poly-C-nitroso compound,
  (c) from 5 to 100 parts by weight of a phosphorus-containing compound selected from the group consisting of an organic phosphonic acid, a compound producing an organic phosphonic acid under vulcanization conditions, a phosphoric acid partial ester, and a compound producing a phosphoric acid partial ester under vulcanization conditions, and
  (d) from 0 to 200 parts by weight of customary fillers and pigments having an improving effect on the vulcanized bond.

These and other objects of the invention will become more apparent as the description thereof proceeds.

DESCRIPTION OF THE INVENTION

The drawbacks of the adhesion assistants or binders of the prior art were solved and the objects of the invention were achieved by an adhesion assistant or binder in the form of an aqueous dispersion which contains per
  (a) 100 parts by weight of an organic oligomeric or polymeric film-former,
  (b) from 5 to 100 parts by weight of an aromatic poly-C-nitroso compound,
  (c) from 5 to 100 parts by weight of an organic phosphonic acid or of a phosphoric acid partial ester and possibly
  (d) up to 200 parts by weight of customary bond-improving fillers.

More particularly, the present invention relates to an aqueous adhesion assistant or binder dispersion for use in the production of composite bodies by vulcanizing a vulcanizable rubber composition on a substrate which is stable under vulcanization conditions comprising water and at least one dispersing agent and a solids content of from 20% to 50% by weight of a solids composition of per
  (a) 100 parts by weight of an organic oligomeric to polymeric film-former,
  (b) from 5 to 100 parts by weight of an aromatic poly-C-nitroso compound,
  (c) from 5 to 100 parts by weight of a phosphorus-containing compound selected from the group consisting of an organic phosphonic acid, a compound producing an organic phosphonic acid under vulcanization conditions, a phosphoric acid partial ester, and a compound producing a phosphoric acid partial ester under vulcanization conditions, and (d) from 0 to 200 parts by weight of customary fillers and pigments having an improving effect on the vulcanized bond.

The invention also relates to the improvement in the process of producing composite bodies by bonding vulcanizable rubber compositions to solid substrates stable under vulcanization conditions comprising coating a solid substrate stable under vulcanizing conditions with an adhesion assistant or binder, laminating a vulcanizable rubber composition thereto and vulcanizing the laminate, the improvement consisting of employing an aqueous adhesion assistant or binder dispersion comprising water and at least one dispersing agent and a solids content of from 20% to 50% by weight of a solids composition of per (a) 100 parts by weight of an organic oligomeric to polymeric film-former, (b) from 5 to 100 parts by weight of an aromatic poly-C-nitroso compound, (c) from 5 to 100 parts by weight of a phosphorus-containing compound selected from the group consisting of an organic phosphonic acid, a compound producing an organic phosphonic acid under vulcanization conditions, a phosphoric acid partial ester, and a compound producing a phosphoric acid partial ester under vulcanization conditions, and (d) from 0 to 200 parts by weight of customary fillers and pigments having an improving effect on the vulcanized bond.

The film-forming materials of organic oligomeric or polymeric nature suitable for use in the aqueous dispersions of the invention are, for example, polymers and copolymers of polar, ethylenically unsaturated compounds such as polyvinyl butyral, polyvinyl formal, polyvinyl acetate, chlorinated polyvinyl chloride, copolymers of vinyl acetate and vinyl chloride, chlorinated copolymers of vinyl acetate and vinyl chloride, poly(meth)acrylic acid, copolymers of (meth)acrylic acid with conjugated dienes such as 1,3-butadiene, 2-chloro-1,3-butadiene, 2,3-dichloro-1,3-butadiene and the like, including post-halogenated products thereof as well as copolymers of vinyl pyridine and conjugated dienes including polyvalent reaction products thereof. Preferred film-forming materials are halogen-containing rubbers or polychloroprene, chlorinated polychloroprene, chlorinated natural rubber, chlorinated polybutadiene, chlorinated polyethylene, chlorinated ethylene/propylene copolymers, other chlorinated compounds such as a chlorinated ethylene/propylene copolymer with other dienes as well as chlorinated copolymers of butadiene with styrene. Also entering into consideration are chlorosulfonated polyethylenes, polypropylenes and polyethylene/propylenes, brominated poly(2,3-dichloro-1,3-butadiene), copolymers of α-chloracrylonitrile with 2,3-dichloro-1,3-butadiene, copolymers of α-bromacrylonitrile with 2,3-dichloro-1,3-butadiene, mixtures of halogen-containing rubber with hydrohalogenated rubbers. Other suitable polymeric film-formers are natural rubber, butyl rubber, ethylene/propylene copolymer rubber, ethylene/propylene/diene terpolymer rubber, polymers and copolymers of dienes with 4 to 12 carbon atoms such as polybutadiene, polybutadiene/styrene, polybutadiene/acrylonitrile. In practice, chlorosulfonated polyethylene or polypropylene has proved successful as film-forming material.

The poly-nitroso compounds suitable for the production of the binders of the invention are derived from a variety of hydrocarbons, in particular aromatic ones. Essentially they are poly-C-nitroso compounds, in particular, aromatic poly-C-nitroso compounds with 1 to 3 aromatic nuclei, including cyclized aromatic nuclei having 2 to 6 nitroso groups which are attached directly to non-adjacent ring carbon atoms. The preferred poly-C-nitroso compounds of the invention are aromatic hydrocarbon di-C-nitroso compounds, such as dinitroso-benzenes and dinitrosonaphthalenes, e.g. meta- or para-dinitroso-benzene and meta- or para-dinitrosonaphthalenes. The ring hydrogen atoms of the aromatic nucleus may be substituted by alkyl, alkoxy, cycloalkyl, aryl, aralkyl, alkaryl, arylamine, arylnitroso, amino, halogen, and the like. The presence of such substituents in the aromatic nucleus or ring has little effect on the activity of the poly-C-nitroso compounds. The following are mentioned as being suitable for the purpose of the invention, for example: m-dinitroso-benzene, p-dinitroso-benzene, m-dinitroso-naphthalene, p-dinitrosonaphthalene, 2,5-dinitroso-p-cymene, 2-methyl-1,4-dinitrosobenzene, 2-methyl-5-chloro-1,4-dinitrosobenzene, 2-fluoro-1,4-dinitroso-benzene, 2-methoxy-1,3-dinitroso-benzene, 5-chloro-1,3-dinitroso-benzene, 2-benzyl-1,4-dinitroso-benzene and 2-cyclohexyl-1,4-dinitroso-benzene.

Naturally, also, the nitroso group-forming compounds, namely oximes with oxidizing agents, can be used. From 5 to 100 parts of the aromatic poly-C-nitroso compounds are employed in the aqueous dispersion per 100 parts of the organic film-former.

The organic phosphonic acids and phosphoric acid partial esters, to be used according to the invention as a third essential component, contain at least one phosphonic or phosphoric acid group as well as an organic radical with one or more functional groups. For example, they may be expressed by the general formula

wherein

is a bivalent organic radical, possibly substituted by halogen, hydroxyl groups, amino groups, alkyl or aryl radicals and which may optionally contain heterogroups, such as

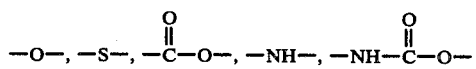

and the like groups. X is hydrogen or a functional group, for example, amino, hydroxyl, epoxy, vinyl, mercapto, halogen and the like.

More particularly, the organic phosphonic acids or phosphoric acid partial esters have the formula selected from the group consisting of

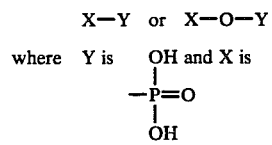

an organic group selected from the group consisting of lower alkenyl, cyclohexenyl, hydroxy-lower alkenyl, halolower alkenyl, carboxy-lower alkenyl, epoxy-lower alkyl, epoxy-lower alkoxy-lower alkyl, epoxy-cyclohexyl, amino-lower alkyl, hydroxy-lower alkyl, mercapto-lower alkyl, halo-lower alkyl, di-phosphonomethyl-amino-lower alkyl, phenyl-hydroxy-phosphonomethyl, aminophenyl-hydroxy-phosphonomethyl, halophenylhydroxy-phosphonomethyl, phenyl-amino-phosphonomethyl, halophenyl-amino-phosphonomethyl, hydroxy-phosphonomethyl, lower alkyl-hydroxy-phosphonomethyl, halo-lower alkylhydroxy-phosphonomethyl, and amino-lower alkyl-hydroxyphosphonomethyl. The acid groups may also be present in a latent form and be released only under the bonding conditions from preliminary stages such as esters. Suitable organic phosphonic or phosphoric acid partial esters are, for example, vinyl phosphonic acid, cyclohexene-(3)-phosphonic acid, α-hydroxy-butene-(2)phosphonic acid, 1-hydroxy-1-phenylmethane-1,1-diphosphonic acid, 1-hydroxy-1-methyl-1,1-diphosphonic acid, 1-amino-1-phenyl-1,1-diphosphonic acid, 3-amino-1-hydroxy-propane-1,1-diphosphonic acid, amino-tris-(methylene phosphonic acid), γ-aminopropyl phosphonic acid, γ-mercaptopropyl phosphonic acid, γ-chloropropyl phosphonic acid, 1,2-epoxyethane phosphonic acid, 3,4-epoxy-cyclohexane phosphonic acid, γ-glycidoxypropyl phosphonic acid, phosphoric acid mono-2-aminoethyl ester, phosphoric acid mono-1-carboxyvinyl ester, phosphoric acid mono-2-hydroxyethyl ester.

For the purpose of the invention, also oligomeric or polymeric phosphonic acids as, for instance, polyvinyl phosphonic acid, are suitable.

Naturally, mixtures of the mentioned compounds may also be used. It is also possible to use reaction products of the organic phosphonic acids or phosphoric acid partial esters having functional groups with strengthening and/or bond-improving resins or pre-resins known in themselves. Examples of such resins or pre-resins are phenol/formaldehyde, alkylphenol/formaldehyde or resorcinol/formaldehyde resins, resoles, novolacs, condensation products from epichlorhydrin and poly-phenols, such as diphenylol propane, novolacs, as well as styrene-maleic acid anhydride copolymers, etc. From 5 to 100 parts of the organic phosphonic acids or phosphoric acid partial esters having functional groups are employed in the aqueous dispersion per 100 parts of the organic film-former.

Lastly the dispersions of the invention may contain the usual bond-improving fillers. For this there enter into consideration carbon black, silicic acid, zinc oxide, basic lead phosphite and the like. Also, if desired, pigments may be incorporated. From 0 to 200 parts of the fillers and pigments are employed in the aqueous dispersion per 100 parts of the organic film-former.

The suitable dispersion aids are primarily surface-active compounds, in particular, non-ionic surfaceactive compounds. Suitable are, for example, the ethylene oxide adducts to alkylphenols, such as nonylphenol or higher fatty alcohols or higher fatty alcohol partial esters with phosphoric acid. Ordinarily from 0.5% to 2.5% by weight, based on the amount of water, are employed. In addition to the nonionic surface-active compounds, the dispersions of the invention may also contain stabilizers for the dispersion such as the water-soluble colloids, such as methyl cellulose, methyl hydroxypropyl cellulose, hydroxy ethyl cellulose, polyvinyl alcohol. Ordinarily from 0 to 3% by weight, preferably from 0.5% to 3% by weight, based on the amount of water, of the dispersion stabilizers are employed.

It has been found that the aqueous adhesion assistant or binder dispersions of the invention are suitable for bonding a plurality of vulcanizable, elastomeric materials to themselves or to other substances. These include vulcanizable mixtures based on natural rubber, polychloroprene rubber, styrene/butadiene rubber, nitrile rubber, rubber from ethylene/propylene copolymers (EPM), rubber from ethylene/propylene/diene terpolymers (EPDM), butyl rubber, polyurethane rubber, etc. The substrates stable under vulcanization conditions are those materials which do not alter their shape under conditions of vulcanization, that is, heating to temperatures of up to about 200° C under pressures of up to 3000 gm/cm². Preferably, the solid substrates are high temperature-resistant fabrics made from fiberglass, polyamides or polyesters and, in particular, metals such as iron, stainless steel, lead, aluminum, copper, brass, bronze, monel metals, nickel, zinc and the like, including treated metals such as phosphatized steel, electroplated steel and, lastly, glass and ceramic materials.

The aqueous adhesion assistant or binder dispersions are applied on the substrate surfaces in the conventional manner such as by immersion, spraying, brushing and the like. After the coating, the substrate surfaces are allowed to dry before they are laminated. After the surfaces have been joined together with the vulcanizable rubber surfaces, the laminate structures are heated in the conventional manner, to cause vulcanization.

The aqueous adhesion assistant or binder dispersions of the invention should have a solids content such that they are still easy to spread or to spray. The solids content is between about 20% and 50% by weight. Organic solvents can be used concomitantly in minor quantity, but their proportion should not exceed 5% by weight of the liquid phase.

The following examples are illustrative of the practice of the invention without being limitative in any respect.

EXAMPLES

In the following examples, the rubber mixtures designated below by A, B, C, D, E, and F were vulcanized on substrates. The composition of the mixture and the vulcanization conditions are stated below. All parts are parts by weight unless otherwise specified.

| Mixture A(NR) | Parts |
| --- | --- |
| Natural rubber (smoked sheet) | 100 |
| Zinc oxide | 10 |
| Stearic acid | 2 |
| Phenyl-β-naphthylamine | 1 |
| Pine tar | 2 |
| Carbon black CK3 | 25 |
| Zn dimethyl dithiocarbamate | 0.33 |
| Dibenzothiazyl disulfide | 0.58 |
| Sulfur | 2.75 |

Vulcanization conditions: 10 minutes at 153° C

| Mixture B (SBR) | Parts |
|---|---|
| Styrene-butadiene rubber | 100 |
| Zinc oxide | 5 |
| Stearic acid | 1 |
| FEF carbon black (Corax 3) | 50 |
| Saturated polymeric petroleum hydrocarbons (liquid) | 8 |
| N-cyclohexyl-2-benzthio-phthalimide | 0.2 |
| Benzthiazyl-2-cyclohexyl-sulfenamide | 0.95 |
| Sulfur | 1.6 |

Vulcanization conditions: 30 minutes at 153° C

| Mixture C (CR) | Parts |
|---|---|
| Polychloroprene rubber | 100 |
| Magnesium oxide | 4 |
| Phenyl-β-naphthylamine | 2 |
| MT carbon black (Sterling) | 80 |
| Vaseline®(M.P.=33–35° C) | 1 |
| Naphthenic oil | 5 |
| Tetramethylthiuram monosulfide | 0.5 |
| Di-o-tolylguanidine | 0.5 |
| 2-Mercaptobenzimidazoline | 0.5 |
| Sulfur | 1 |

Vulcanization conditions: 30 minutes at 153° C.

| Mixture D (EPDM) | Parts |
|---|---|
| Ethylene/propylene/diene terpolymer rubber | 100 |
| Zinc oxide | 5 |
| Stearic acid | 1 |
| Phenyl-β-naphthylamine | 1 |
| Carbon black CK3 | 75 |
| Zinc N-ethylphenyldithiocarbamate | 1 |
| Zn salt of 2-mercaptobenzo-thiazole | 0.8 |
| Dipentamethylenethiuram tetrasulfide | 1 |
| Sulfur | 2 |

Vulcanization conditions: 30 minutes at 153° C.

| Mixture E (IIR) | Parts |
|---|---|
| Butyl rubber | 100 |
| Stearic acid | 1 |
| Zinc oxide | 5 |
| Carbon black Corax 3 | 50 |
| Dibenzothiazyl disulfide | 1 |
| Tellurium diethyldithiocarbamate | 1.5 |
| Sulfur | 1 |

Vulcanization conditions: 30 minutes at 160° C

| Mixture F (NBR) | Parts |
|---|---|
| Nitrile rubber (31% acrylonitrile) | 100 |
| Stearic acid | 1 |
| Zinc oxide | 5 |
| Dibutyl phthalate | 10 |
| Sterling carbon black | 65 |
| Terpene resin | 10 |
| Tetramethylthiuram disulfide | 0.31 |
| Sulfur | 1 |

Vulcanization conditions: 30 minutes at 150° C.

Production of the Aqueous Adhesion Assistant or Binder Dispersion of the Invention 100 parts by weight of a 30% aqueous dispersion of chlorosulfonated polyethylene (35% Cl and 1% S), which contained per 100 parts, as emulsifier, 1.5 parts by weight of the addition product of 20 mols of ethylene oxide onto 1 mol of nonylphenol, 1.5 parts by weight of polyvinyl alcohol (saponification degree 88%) and 0.3 parts by weight of hydroxypropylmethyl cellulose (methylation degree 1.9, propoxylation degree approx. 0.1), were mixed with 30 parts by weight of a 50% aqueous dispersion of dinitrosobenzene/zinc oxide (4:1). After dissolving or dispersing 6 parts by weight of the organic phosphonic acid having functional groups or of the phosphoric acid partial ester having functional groups, the binder is ready for use.

The binders were applied twice with a soft brush on degreased, sandblasted steel plates (25 × 60 mm), waiting with the second application about 1 hour after the first application. Then the sample plate was left in air at room temperature for 15 hours. Following this, the cited rubber mixtures were vulcanized on an area of 25 × 25 mm according to the conditions customary for the respective rubber type as given above.

The composite objects obtained were tested according to ASTM-D 429 B, but by modifying the peeling angle to 45°. The bond values determined (kp/2.5cm) as well as the tear patterns in %

R = Separation in the rubber
RC = Separation between rubber and binder
M = Separation between metal and binder are listed for various aqueous adhesion assistant or binder dispersions in the following tables.

In Table I, the phosphonic acids used as indicated in the first column, then follow as a function of the rubber mixture the values measured for the peeling strength as well as the tear pattern in %. In addition, a comparison test without phosphonic acid is included.

Table 1

| Binder | Rubber type | | | | |
|---|---|---|---|---|---|
| | SBR | CR | EPDM | IIR | NBR |
| | Peeling strength in kp/2.5cm and tear pattern in % | | | | |
| Vinyl phosphonic acid | 31 / 100R | 65 / 100R | 50 / 100R | 40 / 90R/10RC | 65 / 100R | 40 / 100R |
| γ-aminopropyl phosphonic acid | 33 / 100R | 47 / 50RC/R | 52 / 100R | 43 / 100R | 51 / 100R | 43 / 100R |
| Comparison test without phosphonic acid | 28 / 50R/50RC | 32 / 90RC/10R | 0 / 50M/50R | 0 / 100RC | 30 / 100RC | 30 / 30M/30R/40RC |

In the following Table 2, the values for additional phosphonic acid are given as described above.

Table 2

| Binder | Rubber type | | |
|---|---|---|---|
| | NR | SBR | EPDM |
| | Peeling strength in kp/2.5cm and tear pattern in % | | |
| 1-Hydroxyethane diphosphonic acid | 30 / 100R | 69 / 100R | 40 / 90R/10RC |
| 1-Phenyl-1-hydroxy methane-1,1- | 36 / 100R | 74 / 100R | 38 / 90R/10RC |

Table 2-continued

| Binder | Rubber type | | |
|---|---|---|---|
| | NR | SBR | EPDM |
| | Peeling strength in kp/2.5cm and tear pattern in % | | |
| diphosphonic acid 1-Phenyl-1-amino methane-1,1-diphosphonic acid | 31 100R | 51 100R | 33 50R/50RC |

To check the shelf life, the binder mixture containing vinyl phosphonic acid was stored for 6 weeks at 25° C. Then, after stirring thoroughly, sample sheets were bonded with various rubber mixtures by vulcanization as described above. The results obtained are reported in the following Table 3.

Table 3

| | Rubber mixture | | | | | |
|---|---|---|---|---|---|---|
| | NR | SBR | CR | EPDM | IIR | NBR |
| | Peeling strength in kp/2.5cm and tear pattern in % | | | | | |
| Without storage | 31 100R | 65 100R | 50 100R | 40 90R/10RC | 65 100R | 40 100R |
| 6 weeks/25° | 29 100R | 61 100R | 42 100R | 40 80R/20RC | 60 100R | 46 100R |

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. An aqueous adhesion assistant or binder dispersion for use in the production of composite bodies by vulcanizing a vulcanizable rubber composition on a substrate which is stable under vulcanization conditions comprising water and at least one dispersing agent and a solids content of from 20% to 50% by weight of a solids composition of per
   a) 100 parts by weight of an organic oligomeric to polymeric film-former,
   (b) from 5 to 100 parts by weight of an aromatic poly-C-nitroso compound,
   (c) from 5 to 100 parts by weight of a phosphorus-containing compound selected from the group consisting of an organic phosphonic acid, a compound producing an organic phosphonic acid under vulcanization conditions, a phosphoric acid partial ester, and a compound producing a phosphoric acid partial ester under vulcanization conditions, and
   (d) from 0 to 200 parts by weight of customary fillers and pigments having an improving effect on the vulcanized bond.

2. The aqueous dispersion of claim 1 wherein said organic oligomeric to polymeric film-former is a halogenated rubbery polymer or copolymer of polar, ethylenically-unsaturated compounds.

3. The aqueous dispersion of claim 1 wherein said organic oligomeric to polymeric film-former is a chlorosulfonated rubbery polymer or copolymer of polar, ethylenically-unsaturated compounds.

4. The aqueous dispersion of claim 1 wherein said organic oligomeric to polymeric film-former is a chlorosulfonated polyethylene.

5. The aqueous dispersion of claim 1 wherein said aromatic poly-C-nitroso compound is a di-C-nitroso aromatic hydrocarbon.

6. The aqueous dispersion of claim 1 wherein said aromatic poly-C-nitroso compound is dinitrosobenzene.

7. The aqueous dispersion of claim 1 wherein said phosphorus-containing compound is a compound selected from the group consisting of (1) organic phosphonic acids or phosphoric acid partial esters having the formula selected from the group consisting of $$X-Y \text{ or } X-O-Y$$

where Y is OH and X is

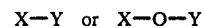

$$\begin{array}{c} | \\ -P=O \\ | \\ OH \end{array}$$

an organic group selected from the group consisting of lower alkenyl, cyclohexenyl, hydroxy-lower alkenyl, halolower alkenyl, carboxy-lower alkenyl, epoxy-lower alkyl, epoxy-lower alkoxy-lower alkyl, epoxy-cyclohexyl, amino-lower alkyl, hydroxylower alkyl, mercapto-lower alkyl, halo-lower alkyl, di-phosphonomethyl-amino-lower alkyl, phenyl-hydroxy-phosphonomethyl, aminophenyl-hydroxy-phosphonomethyl, halophenylhydroxy-phosphonomethyl, phenyl-amino-phosphonomethyl, halophenyl-amino-phosphonomethyl, hydroxy-phosphonomethyl, lower alkyl-hydroxy-phosphonomethyl, halo-lower alkylhydroxy-phosphonomethyl, and amino-lower alkyl-hydroxyphosphonomethyl, and (2) polyvinyl phosphonic acid.

8. The aqueous dispersion of claim 1 wherein said component d) is present in an amount of from 25 to 100 parts per 100 parts of said film-former and is selected from the group consisting of carbon black, silicic acid, zinc oxide, basic lead phosphite and mixtures thereof.

9. In the process of producing composite bodies by bonding vulcanizable rubber compositions to solid substrates stable under vulcanization conditions comprising coating a solid substrate stable under vulcanizing conditions with an adhesion assistant or binder, laminating a vulcanizable rubber composition thereto and vulcanizing the laminate, the improvement consisting of employing an aqueous adhesion assistant or binder dispersion comprising water and at least one dispersing agent and a solids content of from 20% to 50% by weight of a solids composition of per
   (a) 100 parts by weight of an organic oligomeric to polymeric film-former,
   (b) from 5 to 100 parts by weight of an aromatic poly-C-nitroso compound,
   (c) from 5 to 100 parts by weight of a phosphorus-containing compound selected from the group consisting of an organic phosphonic acid, a compound producing an organic phosphonic acid under vulcanization conditions, a phosphoric acid partial ester, and a compound producing a phosphoric acid partial ester under vulcanization conditions, and
   d) from 0 to 200 parts by weight of customary fillers and pigments having an improving effect on the vulcanized bond.

10. The process of claim 9 wherein said organic oligomeric to polymeric film-former is a halogenated rubbery polymer or copolymer of polar, ethylenically-unsaturated compounds.

11. The process of claim 9 wherein said organic oligomeric to polymeric film-former is a chlorosulfonated rubbery polymer or copolymer of polar, ethylenically-unsaturated compounds.

12. The process of claim 9 wherein said organic oligomeric to polymeric film-former is a chlorosulfonated polyethylene.

13. The process of claim 9 wherein said aromatic poly-C-nitroso compound is a di-C-nitroso aromatic hydrocarbon.

14. The process of claim 9 wherein said aromatic poly-C-nitroso compound is dinitrosobenzene.

15. The process of claim 9 wherein said phosphorus-containing compound is a compound selected from the group consisting of (1) organic phosphonic acids or phosphoric acid partial esters having the formula selected from the group consisting of

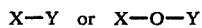

where Y is OH and X is

an organic group selected from the group consisting of lower alkenyl, cyclohexenyl, hydroxy-lower alkenyl, halolower alkenyl, carboxy-lower alkenyl, epoxy-lower alkyl, epoxy-lower alkoxy-lower alkyl, epoxy-cyclohexyl, amino-lower alkyl, hydroxylower alkyl, mercapto-lower alkyl, halo-lower alkyl, di-phosphonomethyl-amino-lower alkyl, phenyl-hydroxy-phosphonomethyl, aminophenyl-hydroxy-phosphonomethyl, halophenylhydroxy-phosphonomethyl, phenyl-amino-phosphonomethyl, halophenyl-amino-phosphonomethyl, hydroxy-phosphonomethyl, lower alkyl-hydroxy-phosphonomethyl, halo-lower alkylhydroxy-phosphonomethyl, and amino-lower alkyl-hydroxyphosphonomethyl, and (2) polyvinyl phosphonic acid.

16. The process of claim 9 wherein said component (d) is present in an amount of from 25 to 100 parts per 100 parts of said film-former and is selected from the group consisting of carbon black, silicic acid, zinc oxide, basic lead phosphite and mixtures thereof.